(12) United States Patent
Rabenhorst

(10) Patent No.: US 6,483,509 B1
(45) Date of Patent: Nov. 19, 2002

(54) CURVE CONTOUR SMOOTHING

(75) Inventor: David Alan Rabenhorst, Woodcliff Lake, NJ (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/288,585

(22) Filed: Apr. 9, 1999

(51) Int. Cl.$^7$ .............................. G06T 5/30; G06T 11/20
(52) U.S. Cl. ........................ 345/442; 345/611; 382/242
(58) Field of Search .................. 345/442, 611, 345/156, 856, 858; 382/242

(56) References Cited

U.S. PATENT DOCUMENTS

| | | | |
|---|---|---|---|
| 5,500,927 A | * | 3/1996 | Sander-Cederlof et al. . 345/442 |
| 5,661,502 A | * | 8/1997 | Cheng ......................... 345/856 |
| 5,668,894 A | * | 9/1997 | Hamano et al. ............. 382/242 |
| 5,933,149 A | * | 8/1999 | Mori et al. .................. 345/442 |

\* cited by examiner

Primary Examiner—Jeffery Brier
(74) Attorney, Agent, or Firm—Louis J. Percello; Charles W. Peterson, Jr.; Louis P. Herzberg

(57) ABSTRACT

A system and method for dramatically reducing the number of vertices defining a polygon on a grid, without significantly changing its effective enclosed area is disclosed. A smoothing process is executed on any general purpose computer system to operate on one or more representations of one or more curves. Each of the curves has a set of a plurality of vertices. The smoothing process first selects a first vertex, a third vertex, and a second middle vertex, the first, second, and third vertices being sequential but not necessarily consecutive on the curve. Then the smoothing process determines the area of a triangle formed by the first, second, and third vertices. This triangular area is compared to a threshold area. If the area is less than the threshold, new vertices are selected along the curve and the process is repeated. However if the area of the triangle is greater than or equal to the threshold, the second (middle) vertex is marked as an important vertex before a new set of vertices is selected. The reduced set of only the important vertices needed may effectively substitute for the complete set when processing the vertices and/or when rendering the curve. This is repeated along the curve until a stop criteria is reached.

21 Claims, 6 Drawing Sheets

| POINT 300 | COORD 310, 311 | | TRIANGLE 320-322 | | | AREA 330 | IMPORTANT 340 |
|---|---|---|---|---|---|---|---|
| # | X | Y | F | M | L | | |
| 1 | 1 | 3 | | | | | 1 |
| 2 | 1 | 4 | | | | | |
| 3 | 1 | 5 | 1 | 2 | 3 | 0.0 | |
| 4 | 1 | 6 | 1 | 2 | 4 | 0.0 | |
| 5 | 2 | 7 | 1 | 3 | 5 | 2.0 | |
| 6 | 2 | 8 | 1 | 3 | 6 | 2.0 | |
| 7 | 3 | 9 | 1 | 4 | 7 | 4.0 | 4 |
| 8 | 4 | 10 | 4 | 6 | 8 | 1.0 | |
| 9 | 5 | 11 | 4 | 6 | 9 | 1.5 | |
| 10 | 6 | 11 | 4 | 7 | 10 | 2.5 | |
| 11 | 7 | 12 | 4 | 7 | 11 | 3.0 | 7 |
| 12 | 8 | 12 | 7 | 9 | 12 | 2.0 | |
| 13 | 9 | 12 | 7 | 10 | 13 | 1.5 | |
| 14 | 10 | 11 | 7 | 10 | 14 | 4.0 | 10 |
| 15 | 11 | 10 | 10 | 12 | 15 | 3.5 | 12 |
| 16 | 11 | 9 | 12 | 14 | 16 | 1.5 | |
| 17 | 12 | 8 | 12 | 14 | 17 | 2.0 | |
| 18 | 11 | 7 | 12 | 15 | 18 | 4.5 | 15 |
| 19 | 11 | 6 | 15 | 17 | 19 | 2.0 | |
| 20 | 11 | 5 | 15 | 17 | 20 | 2.5 | |
| 21 | 10 | 4 | 15 | 18 | 21 | 1.5 | |
| 22 | 9 | 3 | 15 | 18 | 22 | 3.0 | 18 |
| 23 | 8 | 2 | 18 | 20 | 23 | 3.0 | 20 |
| 24 | 7 | 2 | 20 | 22 | 24 | 1.0 | |
| 25 | 6 | 1 | 20 | 22 | 25 | 1.0 | |
| 26 | 5 | 1 | 20 | 23 | 26 | 3.0 | 23 |
| 27 | 4 | 1 | 23 | 24 | 27 | 0.5 | |
| 28 | 3 | 2 | 23 | 25 | 28 | 2.5 | |
| 29 | 2 | 2 | 23 | 26 | 29 | 3.0 | 26 |

FIG.3A

CURVE CONTOUR SMOOTHING

FIELD OF THE INVENTION

This invention relates to the area of computer graphical user interfaces (GUIs). More specifically, the invention relates to smoothing contours of curves and/or polygons as used by GUIs and/or as communicated over networks.

BACKGROUND OF THE INVENTION

A graphical user interface (GUI) is a computer program which uses pictures or images to represent its input and output. A user interacts with the software application by moving a pointer (typically controlled by a pointing device such as a mouse), and selecting objects while pointing to them. The objects are often buttons in windows containing buttons and pictures, but certain applications may support pointing at and selecting parts of pictures or objects in the pictures themselves (eg—painting).

When the selected object or picture part has a non-trivial, non-analytic shape, it may be defined by a closed curve. Closed curves as drawn on computer screens are actually many-sided polygons, where each vertex is a discrete pixel. The most general definition of a typical such closed curve may consist of enumerating all the pixels through which the curve passes. In order for a user of a GUI to select an arbitrary part of a picture or an arbitrary subset of things in the picture, the application may support drawing a closed curve with the pointing device around a portion of the picture. This may be called a "lasso" operation, and involves recording and processing all the pointer device movements generated by the operating system.

Problems with the Prior Art

When a closed curve is used by a GUI for a lasso operation, the list of vertices for the defining polygon are obtained from the operating system (OS) by "mouse movement" events. An operating system will generate a new mouse movement event whenever it detects the mouse moving even a tiny bit, whether or not that movement may actually be significant to the application. In general, such a list of vertices may be quite long, and the number of defining pixels for a such closed curve polygon may easily be in the hundreds, thousands, tens of thousands, or even more. The very large number of vertices required to define such a general polygon at this finest detail consumes storage space, computational power, and perhaps network bandwidth for a distributed software application.

Computationally, processing a long list of pixels could potentially be enormously slow and/or complicated. A software application's processing of a lasso operation may often involve an enumeration of all the objects in the picture, and making a decision for each about whether or not it is inside the lasso (and therefore selected), or outside the lasso (and therefore not selected). The computational complexity of such decisions is not only proportional to the number of objects in the picture for which the decision must be made, but may very well be proportional to the number of vertices defining the enclosing polygon or closed curve.

The real-time interactive processing of a distributed client/server software application is limited by the bandwidth of the computer network over which it must operate. Typical round-trip transmission times may be so slow as to normally preclude real-time iterative processing of all mouse movement events, and thus lasso type operations. "Rubber band" lines forming enclosing polygons on an image thus cannot currently be processed in real time over the network.

OBJECTS OF THE INVENTION

An object of this invention is an improved system and method for smoothing the contour of a curve and/or polygon by reducing the number of vertices in a piece-wise linear representation of the curve/polygon.

An object of this invention is an improved system and method for smoothing the contour of a curve and/or polygon by reducing the number of defining vertices in a piece-wise linear representation of the curve/polygon so that processing of the curve/polygon by an application is simplified and/or made practical.

An object of this invention is an improved system and method for smoothing the contour of a curve and/or polygon by reducing the number of defining vertices in a piece-wise linear representation of the curve/polygon so that communication of a representation of curve/polygon over a network is simplified and/or made practical.

SUMMARY OF THE INVENTION

This invention is a system and method for dramatically reducing the number of vertices defining a polygon on a grid, without significantly changing its effective enclosed area. Benefits include a possibly dramatic reduction of processing required by an application program to perform operations using the polygon and facilitation of storing and/or transmitting this polygon information, e.g. in real time over a network. A smoothing process is executed on any general purpose computer system, typically having one or more central process units, one or more memories, and one or more graphical user interfaces. Usually, the system will have one or more representations of one or more curves stored in one or more of the memories and/or other memories associated with the system (e.g. connected over a network). Each of the curves has a set of a plurality of vertices. The smoothing process first selects a first vertex, a third vertex, and a second middle vertex, the first, second, and third vertices are sequential in a traverse of the curve but not necessarily consecutive on the curve. Then the smoothing process determines the area of a triangle formed by the first, second, and third vertices. This triangular area is compared to a threshold area. If the area is less than the threshold, the second vertex is discarded, a next possibly consecutive vertex is selected as the third vertex, and a new second vertex is determined (in the middle). However if the area of the triangle is greater than or equal to the threshold, the second (middle) vertex is marked as an important vertex and the first vertex is replaced with the second vertex. The next vertex after the previous third vertex becomes the new third vertex, and a new second (middle) vertex is determined. These steps are repeated along the curve until a stop criteria is reached.

BRIEF DESCRIPTION OF THE FIGURES

The foregoing and other objects, aspects, and advantages will be better understood from the following non limiting detailed description of preferred embodiments of the invention with reference to the drawings that include the following:

FIG. 3A is an annotated table of the polygon coordinates illustrating the action and results of the smoothing process as it processes each vertex and filters out the important vertices.

DETAILED DESCRIPTION OF THE INVENTION

Figure 1:
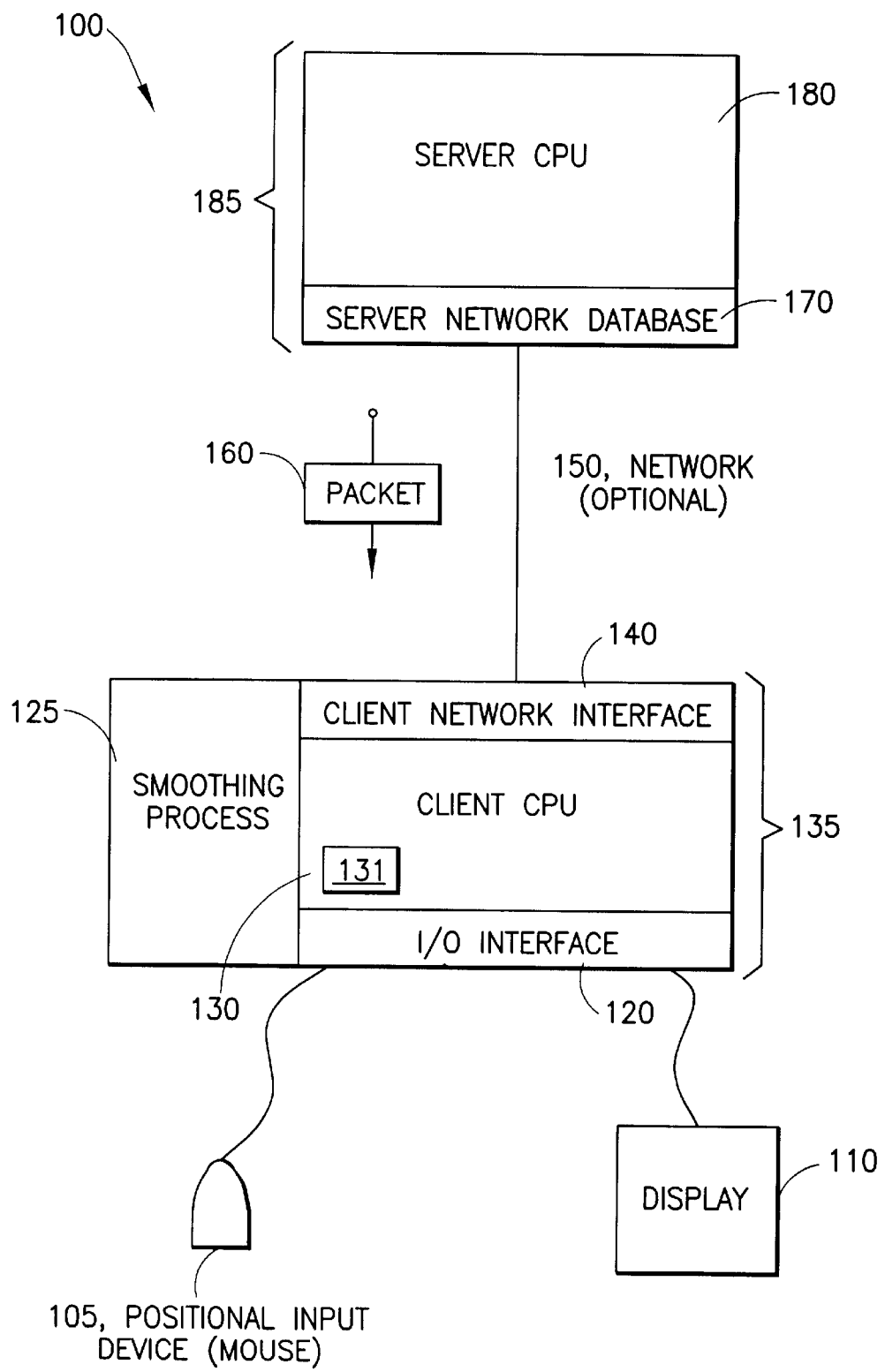
FIG. 1 is a block diagram of one preferred embodiment of the present system with a network connection.

FIG. 1 is a block diagram of one preferred embodiment of the present invention 100. The system 100 comprises any general purpose, well known computer and/or digital logic circuit 135. Typically the computer 135 will have one or more central processing units (CPUs) 130, one or more memories 131, and an input/output (I/O) interface 120 for one or more generally known inputs 105 and outputs 110. Typically inputs 105 include pointing devices 105, e.g. a mouse, and a keyboard 105. Output devices include generally known displays 110. Other input 105 and output 110 devices are envisioned including: pen inputs, speech inputs, and virtual reality outputs. The memory 131 contains one or more representations of curves (not shown) where each curve is defined by a plurality of vertices on a grid or other manner using well know techniques.

In one preferred embodiment, the computer 135 is a network computer 135, typically but not necessarily a client computer, connected to one or more digital networks 150, e.g. the Internet, through any generally known network interface 140. In this embodiment, information, including polygonal information described below communicates between network computers (135, 185) over the network(s) 150 as known packets 160. Here computer 185 is shown in a non limiting way as a server 185 with one or more server central processing units (CPUs) 180 and a known network server interface 170.

The computer 135 CPU 130 also executes a novel smoothing process 125 that is further described below.

Figure 2A:
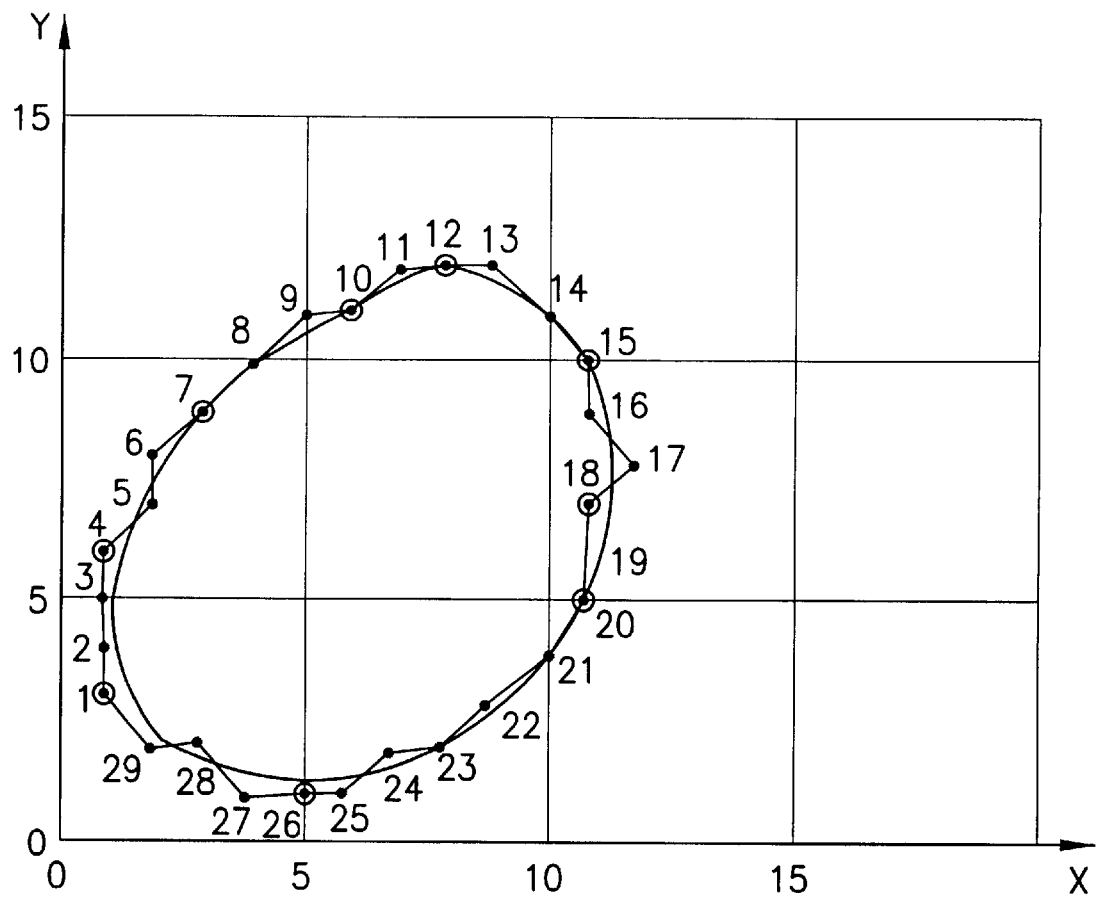
FIG. 2A is a drawing of a curve on a grid, and the unsmoothed polygon defining the curve as quantized onto the grid, showing the way the curve would be shown with pixels on a display screen, and circled "important" points as determined by the process.
Figure 2B:
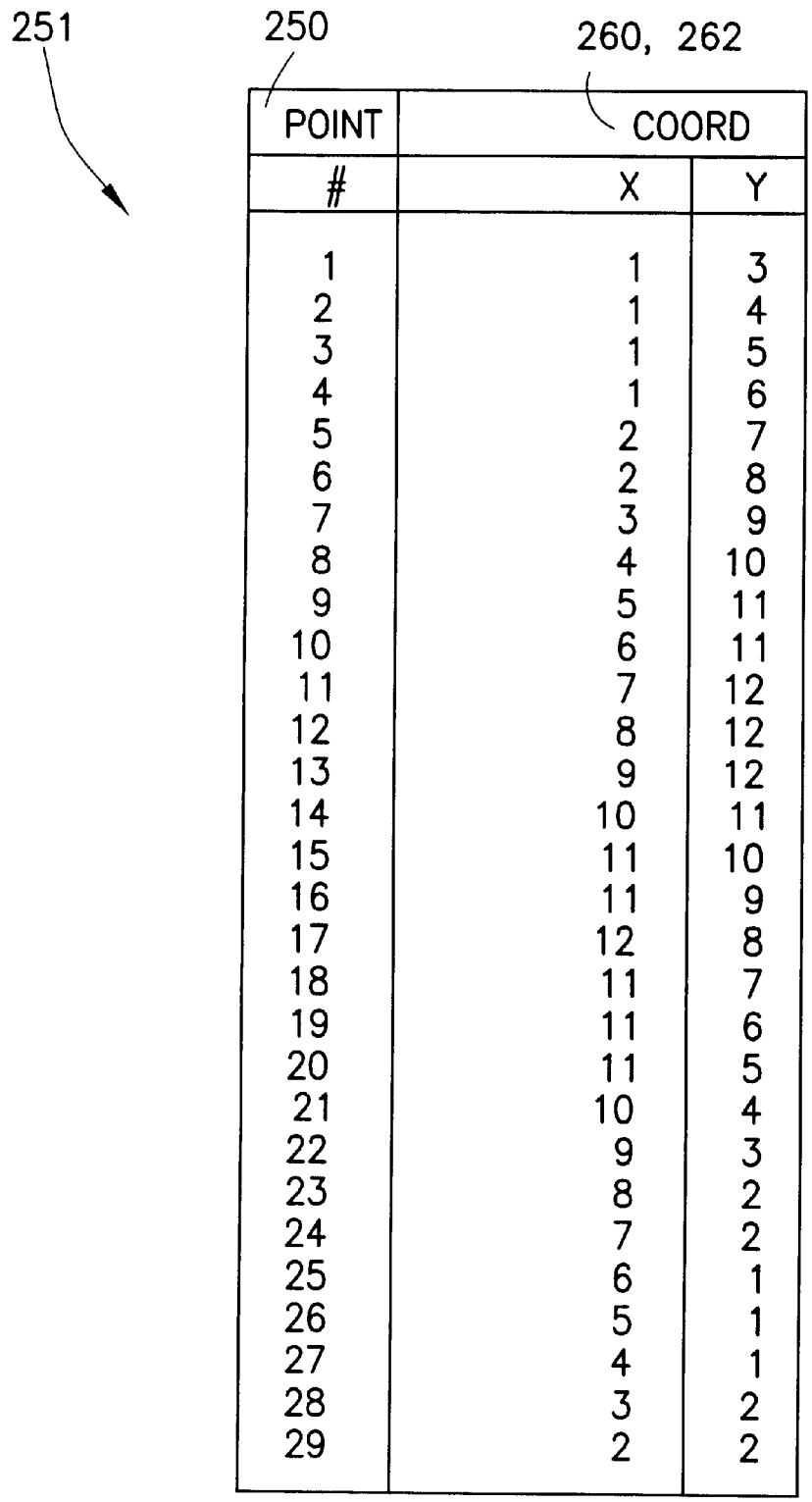
FIG. 2B is a prior art table of the coordinates of the unsmoothed polygon vertices defining the curve on the grid, as from a positional input device such as a mouse.

The invention operates on an original unsmoothed curve/polygon, typically on a grid, which has a minimum quantized integral distance (a single pixel on a screen) as shown in FIG. 2A, and as tabularized in FIG. 2B. The grid need not be Cartesian. The circled points in FIG. 2A are those determined to be "important" by the smoothing process 125. The important points are used to define the smoothed curve.

FIG. 2B is a prior art table of the coordinates of the unsmoothed polygon vertices defining the curve on the grid in FIG. 2A. The first column (250) shows the point vertex number. The second and third columns (260,262) show the X and Y pixel coordinates of each point using a lower left origin. These tables, and their equivalents, without important point designation, are known.

Figure 3B:
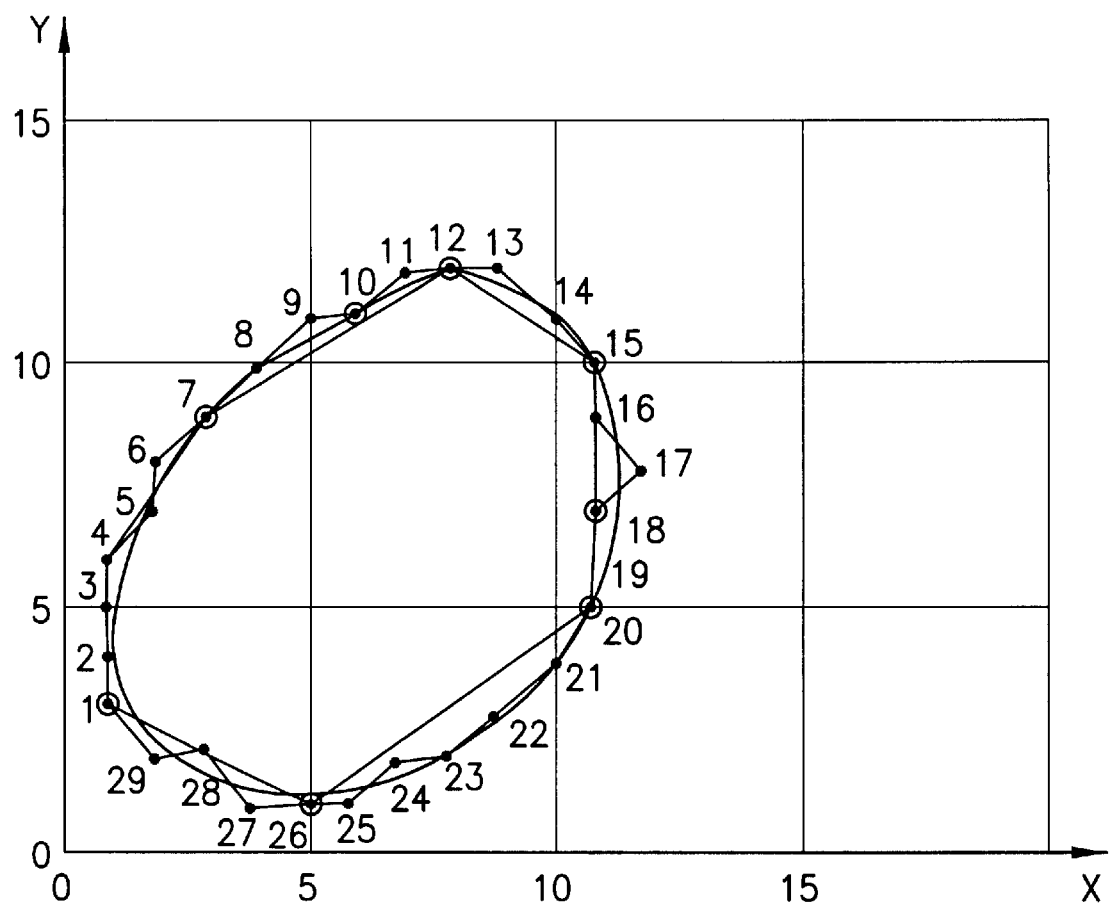
FIG. 3B is a drawing of the smoothed polygon defining the curve as simplified by the process, using just the filtered important vertices overlaid on top of the unsmooth curve for caparison.
Figure 4:
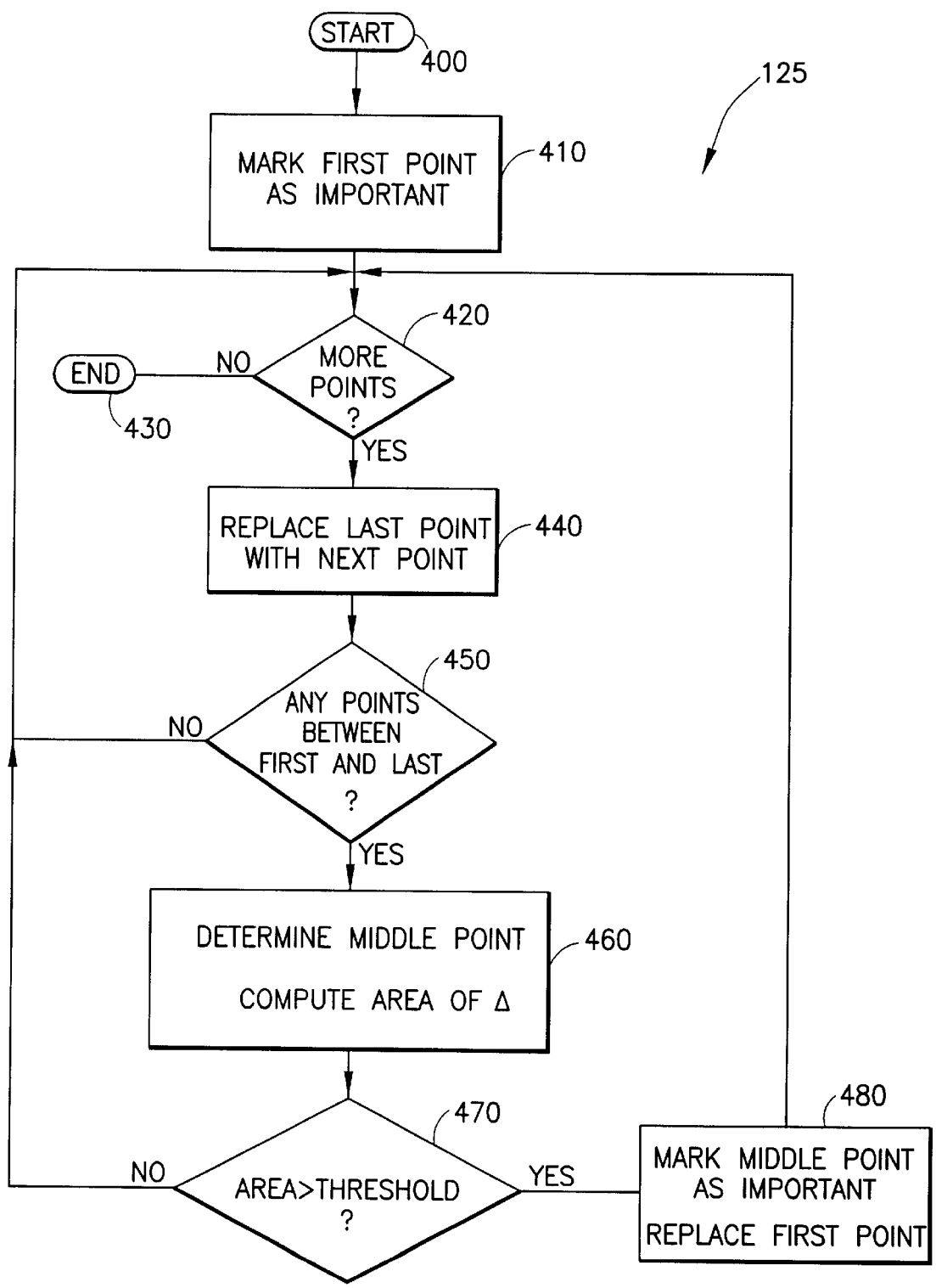
FIG. 4 is a flow chart showing the steps of the curve smoothing process.

One or more, preferable each, vertex point defining the curve passes through a smoothing process as described in FIG. 4 producing the results shown in FIG. 3A. The smoothing filter blocks the passage of unimportant points and results in a smoothed curve of fewer vertices but essentially the same shape and area as shown in FIG. 3B using only the resulting circled points (important) of FIG. 2A.

The smoothing process is a filter which determines point importance by examining the coordinates of each new point in its defining sequence in combination with the coordinates of the last important point (if it exists), and the coordinates of a middle point, which is as close as possible to the midpoint in the defining sequence of the other two. The first point is always "important". As each new point is examined, the importance of its middle point is determined. Typically a defining sequence is the order of the vertices (points) as they are encountered in a one directional, continuous traversal of the curve.

Essentially, the only important points are the ones which make the curve "turn a significant corner". These are determined by computing the area of the triangle formed by the three points currently under consideration, which is a very efficient and fast algorithm. If and only if the area is above a small threshold, then the middle point is considered to be important. Thus, the filter retains only the important vertices of the curve, the curve remains essentially the same shape, and the enclosed area of the curves is not significantly changed. Typical comparison thresholds are small but non-zero. In a preferred embodiment, the thresholds are on the order of about one or two percent of the drawing area in square pixel units. A larger threshold will generally result in more simplification, fewer important vertices, and a rougher approximation to the original unsmoothed curved and its area. A threshold of zero is possible, but will only eliminate perfectly linear vertices, and will result in very little simplification.

FIG. 3A is an annotated table of the polygon coordinates of FIG. 2B illustrating the action and results of the process of FIG. 4 as it processes each vertex, and filters out the important vertices, and results in the circled points of FIG. 2A and the smoothed polygon of FIG. 3B. The first column (300) shows the point vertex number. The second and third columns (310,311) show the X and Y pixel coordinates of each point. The next three columns (320,321,322) show the currently first, middle, and last triangle vertices being considered, respectively. The next column (330) shows the area of the triangle defined by the three points under consideration. The last column (340) shows vertex points which have been determined to be important.

FIG. 4 shows the steps of the smoothing process 125. The process 125 takes as input the list of unsmoothed polygon vertices as shown in FIG. 2B, and an area threshold parameter. For instance, using an area threshold of 3.0, the steps 125 produce the results in FIGS. 3A and 3B as follows:

In step 410 a first point and a direction of traversal are determined. These may in actual fact be imposed by the sequence of points as generated over time by the operating system. Otherwise, they may be chosen at random. The first point is marked as important. The direction of traversal is down the list in FIG. 2B, and counterclockwise in FIGS. 2A and 3B.

The first three points (1, 2, and 3 in row 3 of column 320–322) are accumulated in steps 410–460. Step 420 determines if there are more points on the curve (in the list 251). If there are not, the process 125 ends 430. If there are, step 440 replaces the last point with the next point available in the sequence as determined by time or by the direction of traversal. The best results and the most faithful smoothing approximation are obtained when this next point is the very next consecutive point, but it does not have to be the very next. Skipping points before taking the next point will generally result in fewer important vertices, but on a possibly over-smoothed curve which more roughly approximates the original unsmoothed curve and its area. Step 450 determines if the are any points between the first and the last.

This will not be true the first time through step 450 when only the first two points have been accumulated, so if there are more points in the sequence (at least three the first time through) in step 420 then a different next point is chosen in step 440. Step 460 is entered when the first three points have been accumulated.

In step 460 there, will be a first point and a last point, and at least one interior point between them. That point which is most nearly midway between the first and the last is determined. If there are only three points under consideration, then there can be only one middle point. In a preferred embodiment, if there are an odd number of interior points between the first and the last points, then the middle point is the one which is exactly midway between the first and the last according to the traversal sequence. In a preferred embodiment, if there are an even number of interior points between the first and the last points, then there are two possible choices for the middle point, and either could be used with similar results. In the example described here and shown in FIGS. 2A, 3A, 3B, the first of the two possible middle choices is arbitrarily always used. A possible variation of the algorithm is to always use the second of the two interior choices. Another possible variation of the algorithm is to use both points in two simultaneous instantiations of step 460, and to use for the comparison in step 470 whichever area of the two is the largest. This last variation would achieve the most optimal results in the sense that the resulting smoothed curved will most nearly approximate the unsmoothed curve and the area of the smoothed polygon will most nearly approximate the area of the smoothed polygon. However, in many practical situations, the additional accuracy may not be necessary.

The area of the triangle defined by the three points is computed in step 460 on line 3 column 330. The area A of a triangle defined by three the points x1,y1 and x2,y2 and x3,y3 can be calculated from the following formula:

$$A=abs([x1*y2+x2*y3+x3*y1-y1*x2-y2*x3-y3*x1])/2$$

where abs is the absolute value. The division by 2 need not actually be performed during the calculation of each triangle's area if the threshold it is compared against is pre-multiplied by 2.

Since the first area computed in step 460 is 0.0 in row 3 of column 330 and is not above the threshold in step 470, the middle point (2) is not considered important, and the first point remains the same.

Since there are more points available in step 420, the algorithm continues. In step 440, the next point (4 in row 4 of column 322) is taken to be the new last point to be considered with the same first point (1 in row 4 of column 320). In step 460, the point mostly nearly halfway in between the first point (1) and new point (4) is determined in step 460 to be the middle point (2 in row 4 of column 321). The area of the triangle defined by them is computed on line 4 of column 330, and found to be 0.0. Since the area is not above the threshold in step 470, the middle point (2) is still not considered important, and the first point remains the same.

In step 440, the next point (5 in row 5 of column 322) is considered with the first point (1 in row 5 of column 320). The point mostly nearly halfway in between the first point (1) and new point (5) is determined in step 460 to be the new middle point (3 in row 5 of column 321). The area of the triangle defined by them is computed in step 460 on line 5, and found to be 2.0. Since the area is not above the threshold of 3.0 in step 470, the middle point (3) is not considered important, and the first point remains the same.

In step 440, the next point (6 in row 6 of column 322) is considered with the first point (1 in row 6 of column 320). The point mostly nearly halfway in between the first point (1) and new point (6) is determined in step 460 to be the point (3). The area of the triangle defined by them is computed in step 460 on line 6, and found to be 2.0. Since the area is not above the threshold of 3.0 in step 470, the middle point (3) is not considered important, and the first point remains the same.

In step 440, the next point (7 in row 7 of column 322) is considered with the first point (1 in row 7 of column 320). The point mostly nearly halfway in between the first point (1) and new point (7) is determined in step 460 to be the point (4). The area of the triangle defined by them is computed in step 460 on line 7, and found to be 4.0. Since the area is above the threshold of 3.0 in step 470, the middle point (4) is considered important in step 480 and is noted in row 7 of column 340, and becomes the new first point in row 8 of column 320.

The process is repeated until all the points are traversed as determined by either step 420 or step 450. This example gives a vertex reduction ratio of about 34.5%, and an enclosed area approximation factor of about 90.4%.

In one preferred embodiment, step 420 may be some other stop criteria or may be another stop criteria used alternatively with a determination of the end of the points. Non limiting examples of stop criteria include: receiving a controlling event such as a mouse click, reaching a last vertex on the curve, returning to the initial vertex, processing a given number of vertices, and the passing of a time period.

The process 125 may be applied to either closed or unclosed curves which are either convex or concave.

The process 125 can be implemented as a feature inside an OS, thus being completely transparent, and imposing no additional application requirements at all.

The invention may be used where the important vertices are used to represent the curve in one or more application programs. An example is the lassoing of selected points in a scatter plot of many points. In order to accomplish that, a determination needs to be made whether each point in the plot is inside or outside the lasso curve. The complexity of the calculation is considerably reduced by the curve smoothing approximation.

The invention has uses in many networking applications where information about curves is stored and/or communicated. For example, duplex information about one or more of the important vertices is received (transmitted) from (to) the network 150 through the network interface (140, 170). An example is the real-time processing of the points of a curve as it is drawn, and the processing 125 involves generating polygon vertices emitted from a mouse on a scene which is displayed on the client but generated on the server, and processing them such as to bound objects in the scene which are maintained by the server.

I claim:

1. A computer system having one or more central process units, one or more memories, and one or more graphical user interfaces, the system further comprising:
   a representation of one or more curves in one or more of the memories, each of the curves being represented by a set of vertices;
   a smoothing process for reducing memory needed for smoothed said curves, said smoothing process comprising the steps of:
   a. selecting from a vertex set representing an unsmoothed curve, a first vertex, a third vertex, and a second middle vertex, the first, second middle, and third vertices being on a sequence of traversal of the curve;

b. determining the area of a triangle formed by the first, second, and third vertices;

c. comparing the area to a threshold;

d. discarding the second middle vertex if the area is less than the threshold, and selecting a next vertex as the third vertex, and redetermining a new second middle vertex;

e. marking the second middle vertex as an important vertex if the area of the triangle is greater than or equal to the threshold, and replacing the first vertex with the second middle vertex, the third vertex with the next vertex, and redetermining a new second middle vertex;

f. repeating steps b through e until a stop criteria is reached; and g. replacing in memory said vertex set for said unsmoothed curve with a set of important vertices for a smoothed said curve.

2. A system, as in claim 1, where the vertices are determined from outputs of a positional input device.

3. A system, as in claim 2, where the positional input device is any one or more of the following: a mouse, a pointer key, a track ball, a pen input, and a track point.

4. A system, as in claim 1, where the stop criteria is any one or more of the following: receiving a controlling event, reaching a last vertex on the curve, returning to the initial vertex, processing a given number of vertices, and the passing of a time period.

5. A system, as in claim 1, where the important vertices are used to represent the curve in one or more application programs.

6. A system, as in claim 1, that further comprises a network interface that connects to one or more networks.

7. A system, as in claim 6, where the important vertices represent the curve and are communicated through the network interface over one or more of the networks.

8. A system, as in claim 7, where duplex information about one or more of the important vertices is received from the network through the network interface.

9. A system, as in claim 1, where the next vertex is consecutive in the sequence of traversal of the curve.

10. A system, as in claim 1, where the next vertex is not consecutive in the sequence of traversal of the curve.

11. A computer system as in claim 1 wherein at least one curve is a closed curve represented by a polygon, a selected area object enclosed by said closed curve being substantially enclosed by a smoothed said closed curve, whereby complexity of calculation for determining whether said objects are enclosed by said smoothed closed curve is substantially reduced from said closed curve.

12. A computer system as in claim 11 wherein vertices in said vertex set are generated in real time as said closed curve is drawn on a scene displayed on a client display.

13. A smoothing process for smoothing a curve represented as a set of vertices, a smoothed said curve being represented by a subset of said set of vertices, said smoothing process comprising the steps of:

a. selecting a first vertex, a third vertex, and a second middle vertex from a vertex set representing a curve, the first, second middle, and third vertices being on a sequence of traversal of the curve;

b. determining the area of a triangle formed by the first, second middle, and third vertices;

c. comparing the area to a threshold;

d. discarding the second middle vertex if the area is less than the threshold, selecting a next vertex as the third vertex, and redetermining a new second middle vertex;

e. marking the second middle vertex as an important vertex if the area of the triangle is greater than or equal to the threshold, and replacing the first vertex with the second middle vertex, the third vertex with the next vertex, and redetermining a new second middle vertex; and f. repeating steps b through e until a stop criteria is reached; and g. providing a set of important vertices representing a smoothed said curve.

14. A smoothing process as in claim 13 wherein at least one curve is a closed curve represented by a polygon, a selected area object enclosed by said closed curve being substantially enclosed by a smoothed said closed curve, whereby complexity of calculation for determining whether said objects are enclosed by said smoothed closed curve is substantially reduced from said closed curve.

15. A smoothing process as in claim 14 wherein vertices in said vertex set are generated in real time as said closed curve is drawn on a scene displayed on a client display.

16. A system for smoothing curves each represented as a vertex set, said system comprising:

means for selecting from a vertex set a first vertex, a third vertex, and a second middle vertex, the first, second, and third vertices being on a sequence of traversal of the curve;

means for determining whether the area of a triangle formed by the first, second middle, and third vertices is less than a threshold;

means for discarding the second middle vertex if the area is less than the threshold, a next vertex being selected as the third vertex, and a new second middle vertex being determined;

means for marking the second middle vertex as an important vertex if the area of the triangle is greater than or equal to the threshold, the first vertex being replaced with the second middle vertex, the third vertex being replaced with the next consecutive vertex, and a new second middle vertex being determined; and means for replacing said vertex set with an important vertex set representative of a smoothed said curve.

17. A system as in claim 16 wherein at least one curve is a closed curve represented by a polygon, a selected area object enclosed by said closed curve being substantially enclosed by a smoothed said closed curve, whereby complexity of calculation for determining whether said objects are enclosed by said smoothed closed curve is substantially reduced from said closed curve.

18. A system as in claim 17 wherein vertices in said vertex set are generated in real time as said closed curve is drawn on a scene displayed on a client display.

19. A computer program product that performs the steps of:

a) receiving a vertex set representative of an unsmoothed curve;

b) selecting from said vertex set a first vertex, a third vertex, and a second middle vertex, the first, second middle, and third vertices being on a sequence of traversal of the curve;

c) determining whether the area of a triangle formed by the first, second middle, and third vertices is less than a threshold;

d) discarding the second vertex if the area is less than the threshold, and selecting a next vertex as the third vertex, and redetermining a new second middle vertex;

e) marking the second middle vertex as an important vertex if the area of the triangle is greater than or equal to the threshold, and replacing the first vertex with the second vertex, the third vertex with the next vertex, and redetermining a new second middle vertex;

f) repeating steps c through e until a stop criteria is reached; and g) providing an important vertex set representative of a smooth said curve.

20. A computer program product as in claim 19 wherein at least one curve is a closed curve represented by a polygon, a selected area object enclosed by said closed curve being substantially enclosed by a smoothed said closed curve, whereby complexity of calculation for determining whether said objects are enclosed by said smoothed closed curve is substantially reduced from said closed curve.

21. A computer program product as in claim 20 wherein vertices in said vertex set are generated in real time as said closed curve is drawn on a scene displayed on a client display.

* * * * *